No. 895,181. PATENTED AUG. 4, 1908.
J. G. HIMMELSBACH.
LAWN EDGE TRIMMER.
APPLICATION FILED JULY 26, 1907.
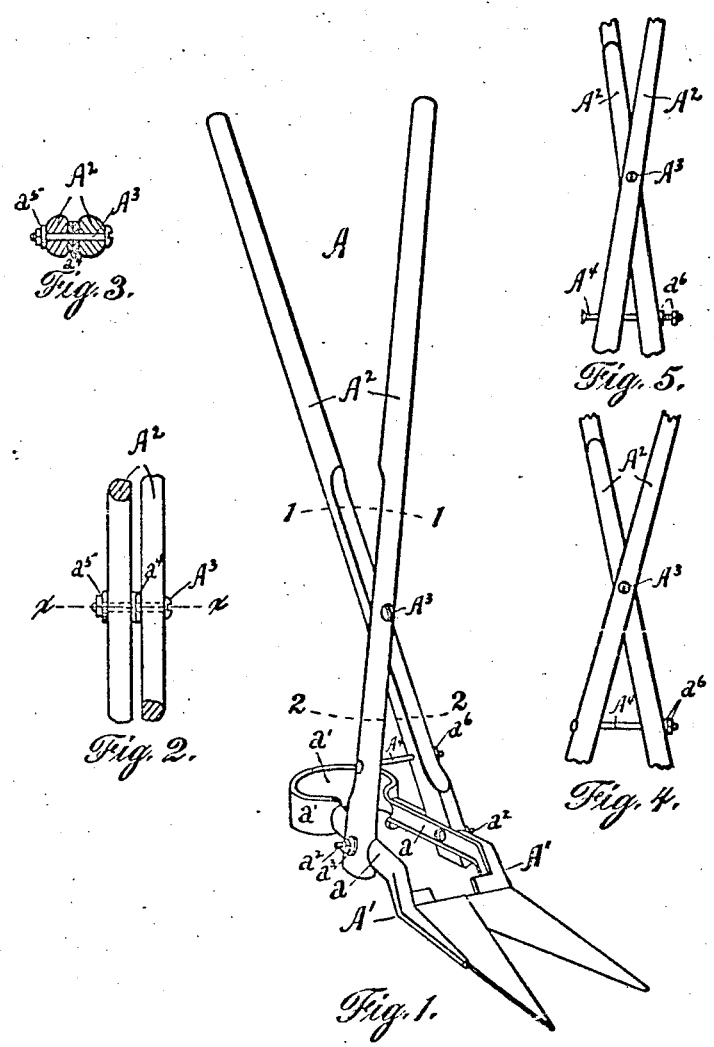
WITNESSES:
INVENTOR:
John G. Himmelsbach.
BY
ATTORNEY.

UNITED STATES PATENT OFFICE.

JOHN G. HIMMELSBACH, OF LANCASTER, PENNSYLVANIA, ASSIGNOR TO CLARENCE L. BARR, OF LANCASTER, PENNSYLVANIA.

LAWN-EDGE TRIMMER.

No. 895,181.   Specification of Letters Patent.   Patented Aug. 4, 1908.

Application filed July 26, 1907. Serial No. 385,729.

*To all whom it may concern:*

Be it known that I, JOHN G. HIMMELSBACH, a citizen of the United States, residing at Lancaster, in the county of Lancaster and State of Pennsylvania, have invented new and useful Improvements in Lawn-Edge Trimmers, of which the following is a specification.

This invention relates to improvements in a lawn edge trimmer of that class in which a pair of shears, such as are used for shearing sheep, have their shanks secured to the lower ends of a pair of cross arms pivoted or fulcrumed together so as to be spread apart or brought together by the hands of the person operating the shears; in which provision is made by means of a rod or bolt to prevent the blades of the shears from being opened too wide.

The object of the invention is to provide an effective lawn edge trimmer, simple in construction and not easily gotten out of order, to be used in places not capable of being reached by the lawn mower, and in which the operator using the same may always remain in a perfectly upright position.

The elements of the invention will severally and at large appear in the following description and they will be separately or combinedly set forth or pointed out in the appended claim or claims.

The purposes of the invention are attained by the mechanism, devices and means illustrated in the accompanying drawing, in which similar reference characters designate like parts throughout the several views, in which:—

Figure 1 is a perspective view, viewed practically from the front, of the trimmer referred to in the opening paragraph hereto; Fig. 2 is a direct side elevation of the part comprehended by the broken lines indicated by the numerals 1, 1 and 2, 2 in Fig. 1, as it appears when viewed from the left; Fig. 3 is a cross section taken on the line $x\,x$ in Fig. 2; Fig. 4 is a direct front elevation of the bars about the fulcrum, as they appear when spread apart to operate the shears, opening them to their full extent; Fig. 5 is a similar view of the same bars, as they appear when partially opened.

In the drawing A designates the completed trimmer before mentioned, in which $A^1$ designates the shears with their shanks $a\,a$ rearwardly extended, terminating at their rear ends in a bow $a^1$, constituting the actuating spring; the shanks being secured to the lower ends of the bars $A^2$ which are gouged out adjacent to their lower ends to receive said shanks, being secured in place by bolts $a^2$ with washers and nuts $a^3$ on their threaded ends. The handle bars $A^2$ are crossed and fulcrumed together by a bolt $A^3$, allowing them to be spread apart for opening the shears and drawn together again for closing them. On each side of the fulcrum said bars are cut out on their adjacent sides, flattening them, and provided with flat metal plates or washers $a^4$, through which the fulcrum bolt $A^3$ is passed, having a washer and nut $a^5$ on its threaded end, completing the fulcrum joint. Between the fulcrum joint and the shanks $a\,a$ is a bolt $A^4$ having a head on one end engaging against the outer surface of one of said handle bars and a washer and nut $a^6$ on its threaded end engaging against the outer surface of the other one, preventing the spread of the handle bars and the blades of the shears from being opened too wide, so that the rear ends of their cutting edges cannot contact, one with the other, preventing their smooth operation in cutting, best shown in Fig. 4.

The invention having thus been ascertained and described and the manner in which its functions are performed fully shown and set forth, what is considered new and desired to be secured by Letters Patent is:—

1. In a lawn edge trimmer of the class described, in combination with a pair of sheep shears, a pair of cross arms cut away on their adjacent sides to flatten them, and having their lower ends secured to the arms of said shears, a pivot bolt passed through said cross arms at their point of contact, for the purpose set forth.

2. In a lawn edge trimmer of the class described, in combination, a pair of fulcrumed cross arms having their lower ends secured to the arms of a pair of sheep shears, a pivot bolt passing through said cross arms at their point of contact and adapted to secure said arms in a pivoted manner one with the other, a stop bolt passing through said cross arms, at right angles to said pivot bolt and below their point of contact, for the purpose of limiting their action, for the purpose set forth.

In testimony whereof I affix my signature, in presence of two subscribing witnesses.

JOHN G. HIMMELSBACH.

Witnesses:
MABEL L. LEFEVRE,
CHAS. F. BOWMAN.